(12) United States Patent
Mapp et al.

(10) Patent No.: US 12,146,409 B2
(45) Date of Patent: *Nov. 19, 2024

(54) MINING SYSTEM

(71) Applicant: Underground Extraction Technologies Pty Ltd, Brisbane (AU)

(72) Inventors: Michael Mapp, Long Point (AU); Brian MacDonald, Brisbane (AU)

(73) Assignee: Underground Extraction Technologies Pty LTD, Brisbane (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/311,008

(22) Filed: May 2, 2023

(65) Prior Publication Data

US 2023/0265758 A1 Aug. 24, 2023

Related U.S. Application Data

(63) Continuation of application No. 17/271,736, filed as application No. PCT/AU2019/050954 on Sep. 6, 2019, now Pat. No. 11,746,653.

(30) Foreign Application Priority Data

Sep. 7, 2018 (AU) ................................ 2018903338

(51) Int. Cl.
*E21C 35/24* (2006.01)
*E21C 27/24* (2006.01)
(Continued)

(52) U.S. Cl.
CPC .............. *E21C 35/24* (2013.01); *E21C 27/24* (2013.01); *E21C 41/18* (2013.01); *E21F 13/02* (2013.01); *E21C 29/22* (2013.01)

(58) Field of Classification Search
CPC .......... E21C 27/24; E21C 29/22; E21C 35/08; E21C 35/20; E21C 35/24; E21C 41/16;
(Continued)

(56) References Cited

U.S. PATENT DOCUMENTS 2,674,364 A 4/1954 Cartlidge
2,722,409 A 11/1955 Bergmann
(Continued)

FOREIGN PATENT DOCUMENTS

CN 101270664 A 9/2008
CN 105179006 A 12/2015
(Continued)

*Primary Examiner* — Janine M Kreck
*Assistant Examiner* — Michael A Goodwin
(74) *Attorney, Agent, or Firm* — DeLio Peterson & Curcio LLC; Kelly M. Nowak

(57) ABSTRACT

The present invention relates to a mining system. The system includes a continuous miner for forming plunge tunnels from a roadway. A flexible conveyor system is coupled to the continuous miner for conveying mined material from the plunge tunnels. A controller is provided for controlling the continuous miner and the flexible conveyor system to travel along a predetermined path. Advantageously, the controller may control the drive and steering (including turning maneuvers) of the continuous miner and each conveyor module of the flexible conveyor system along the predetermined path to avoid striking either any adjacent equipment (e.g., another conveyor), or the "ribs" of a plunge tunnel being mined.

20 Claims, 3 Drawing Sheets

(51) Int. Cl.
   *E21C 41/18*   (2006.01)
   *E21F 13/02*   (2006.01)
   *E21C 29/22*   (2006.01)

(58) Field of Classification Search
   CPC .......... E21C 41/18; E21F 13/02; E21F 13/08;
   E21F 13/083; B65G 15/22; B65G 15/24;
   B65G 41/007; B65G 41/008
   See application file for complete search history.

(56) References Cited

U.S. PATENT DOCUMENTS

| | | | |
|---|---|---|---|
| 2,805,758 A | 9/1957 | Madeira et al. | |
| 3,003,612 A | 10/1961 | Poundstone | |
| 3,268,058 A * | 8/1966 | Buckeridge | E21F 13/02 |
| | | | 198/304 |
| 5,881,832 A | 3/1999 | Zitz et al. | |
| 5,967,616 A * | 10/1999 | Offutt | E21C 27/24 |
| | | | 299/30 |
| 2001/0015573 A1* | 8/2001 | Mraz | E21C 35/24 |
| | | | 299/33 |
| 2004/0054434 A1 | 3/2004 | Sturges et al. | |
| 2012/0146387 A1 | 6/2012 | Shatters | |
| 2015/0115691 A1 | 4/2015 | Brinager et al. | |
| 2016/0096688 A1* | 4/2016 | Hartcher | E21C 35/24 |
| | | | 198/304 |
| 2017/0248017 A1 | 8/2017 | MacDonald et al. | |

FOREIGN PATENT DOCUMENTS

| | | |
|---|---|---|
| DE | 102011105747 A1 | 12/2012 |
| GB | 2229747 A | 10/1990 |
| WO | 2008067802 A1 | 6/2008 |
| WO | WO2016044886 A1 | 3/2016 |
| WO | 2018068866 A1 | 4/2018 |

* cited by examiner

MINING SYSTEM

BACKGROUND OF THE INVENTION

1. Field of the Invention

The present invention relates to a mining system. The present invention has particular, although not exclusive application to an underground coal mining system.

1. Description of Related Art

The reference to any prior art in this specification is not, and should not be taken as an acknowledgement or any form of suggestion that the prior art forms part of the common general knowledge.

Underground coal mines include a series of roadways (i.e., mined out tunnels) of varying mine plan layout to suit the reserve of coal being mined. The roadways are supported, in the roof strata and/or in the side-walls called "ribs", to enable the safe passage of personnel to enter and exit the mine. The supported roadways stay safely open for the passage of equipment, for the installation of services (compressed air, water, electrical power infrastructure), and for the carriage of mine ventilation air throughout the mine.

A series of unmined coal "blocks," or unmined coal reserve areas, are located between the roadways, with the roadways also providing access to these unmined coal "blocks." A series of fixed conveyors are provided which transport the coal being mined from the "blocks" away from the mining areas. The conveyors interconnect and take the coal from the active mining area to the surface of the mine.

In recent times, a penetrating block extraction (PBE) method of mining has been deployed by the Applicant which involves the mining of extended tunnels (or "Plunges") of varying length into the coal seam (i.e., the unmined "blocks") as described in PCT/AU2015/050531.

The PBE method of mining of the "blocks" uses continuous mining equipment and some form of connected flexible conveyor system which carries the coal away from the continuous miner to the fixed conveyors elsewhere in the mine—i.e., away from the Plunge tunnel being mined.

The continuous flexible conveyor system is suitably designed and constructed such that it can continuously convey and transport coal in both a straight line and around the "corner," at which the plunge tunnel is angled from the underground roadway which is immediately adjacent to the Plunge tunnel.

At the commencement of mining a Plunge tunnel, the continuous miner first enters the Plunge which is to be formed (at the desired angle off the developed roadway adjacent to the Plunge), by cutting the coal out in front of its advance. The continuous miner then continues to cut the coal as it advances in the desired direction of the planned Plunge tunnel. The first conveyor modules of the flexible conveyor system follows directly behind the continuous miner into the mined-out Plunge tunnel as the continuous miner advances, since it is connected to the continuous miner via a suitably strengthened coupling. at the rear of the continuous miner unit.

Each of the subsequent conveyor modules of the flexible conveyor system need to travel along the developed roadway adjacent the Plunge tunnel to be mined, and then must travel through a designated travel pathway in order to enter the Plunge tunnel being mined without striking either the adjacent equipment, or the "ribs" of the Plunge tunnel being mined.

The preferred embodiment provides a means for controlling the continuous miner coupled to the flexible conveyor system, including withdrawal from the plunge once it has been fully mined.

The preferred embodiment provides a means for controlling the continuous miner coupled to the flexible conveyor system to avoid striking either the adjacent equipment, or the "ribs" of the Plunge tunnel being mined.

SUMMARY OF THE INVENTION

According to one aspect of the present invention, there is provided a mining system including: a continuous miner for forming plunge tunnels from a roadway; a flexible conveyor system coupled to the continuous miner for conveying mined material from the plunge tunnels; and a controller for controlling the continuous miner and the flexible conveyor system to travel along a predetermined path.

Advantageously, the controller may control the drive and steering (including turning maneuvers) of the continuous miner and each conveyor module of the flexible conveyor system along the predetermined path to avoid striking either any adjacent equipment (e.g., another conveyor), or the "ribs" of a plunge tunnel being mined.

The system may further include another conveyor in the roadway for receiving the mined material from the flexible conveyor system. The controller may further control advancement of the other conveyor along the roadway as the continuous miner forms the plunge tunnels. Advantageously, the other conveyor is advanced along the roadway as the continuous miner forms the plunge tunnels avoiding the need to otherwise disassemble and re-assemble a fixed conveyor.

The controller may include a path planner for planning the predetermined path for the continuous miner and flexible conveyor system. The path planner may plan paths for respective conveyor modules of the flexible conveyor system. The path planner may plan the formation of the next plunge tunnel proximal to a head of the other conveyor.

The system may further include a location sensor for sensing location of the other conveyor. The continuous miner may include an inertial navigation unit.

The system may further include a side discharge conveyor for discharging the mined material from the side of the flexible conveyor to the other conveyor.

The flexible conveyor system may include serially interconnected flexible conveyor modules. Each conveyor module may include wheels. The wheels may include 2 or 4 wheels. Each conveyor may include a driver for driving the wheels. The driver may be electrical, pneumatic or hydraulic. Each conveyor may include steering for steering the wheels. The steering may be electrical, pneumatic or hydraulic. The steering may include rams or rotary actuators 403.

Each conveyor module may include a proximity sensor for sensing the proximity of one or more walls of a plunge tunnel in which it is located.

Alternatively, each conveyor module may include endless tracks for improved traction and lower ground pressure.

Preferably, the continuous miner is unmanned. The controller may be located remote from the other conveyor.

According to another aspect of the present invention, there is provided a mining method involving: forming plunge tunnels from a roadway with a continuous miner; conveying mined material from the plunge tunnels using a flexible conveyor system coupled to the continuous miner;

and controlling the continuous miner and the flexible conveyor system to travel along a predetermined path.

Any of the features described herein can be combined in any combination with any one or more of the other features described herein within the scope of the invention.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF EMBODIMENT(S)

Figure 1:
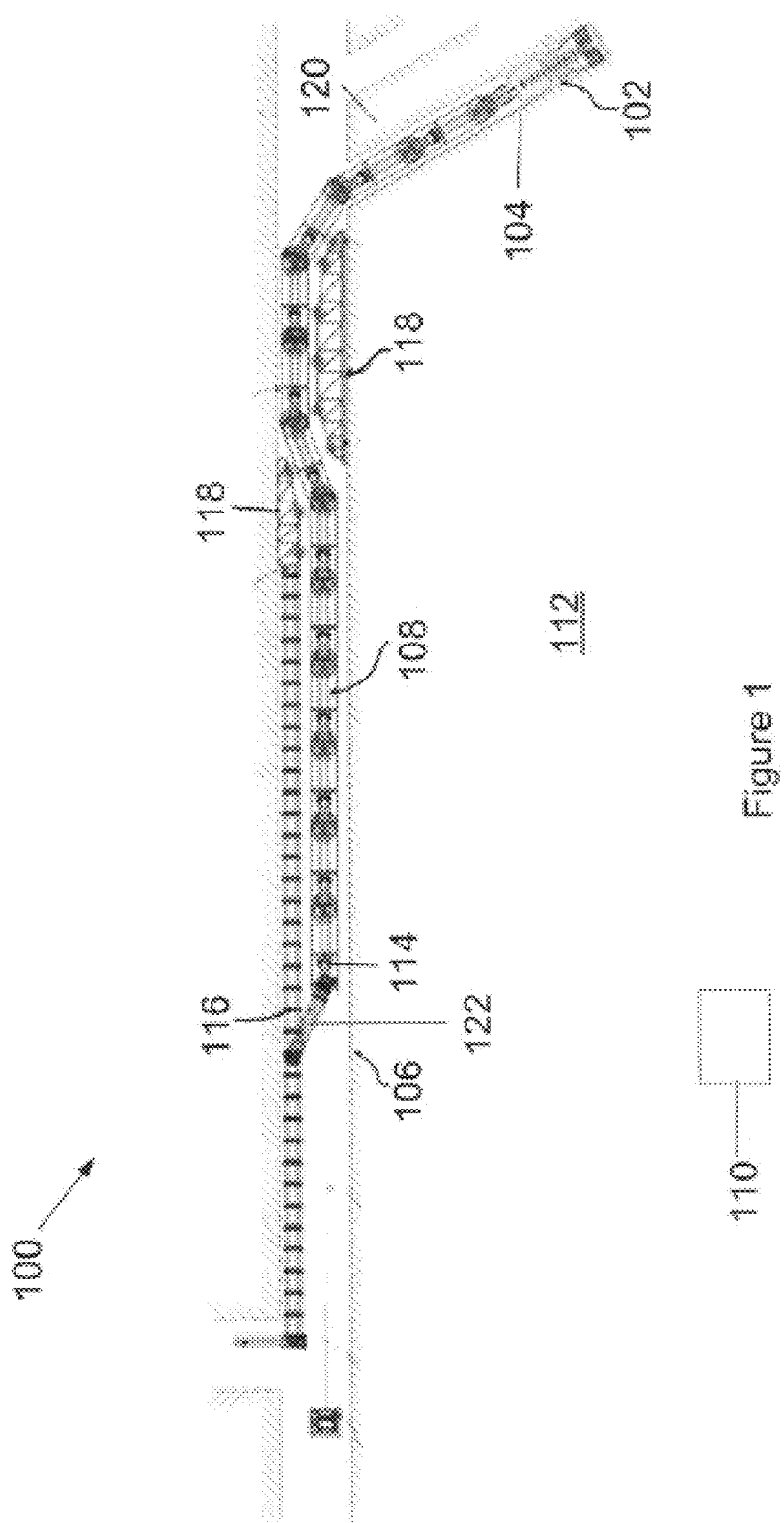
FIG. 1 is a plan view of a mining system in accordance with an embodiment of the present invention.

According to an embodiment of the present invention, there is provided a mining system 100 as shown in FIG. 1. The system 100 includes a continuous miner 102 for serially forming plunge tunnels 104 along a roadway 106. A flexible conveyor system 108 is coupled to the continuous miner 102 for conveying mined material from the plunge tunnels 104. A remote wireless controller 110 is provided for controlling the continuous miner 102 and the flexible conveyor system 108 to travel along a predetermined path coinciding with the roadway 106 and plunge tunnels 104, including those yet to be formed in the unmined block 112.

Advantageously, the controller 110 controls the drive and steering (including turning maneuvers) of the continuous miner 102 and each conveyor module 114 of the flexible conveyor system 108 along the predetermined path to avoid striking either any adjacent equipment (e.g., a rigid transfer conveyor 116, guides 118, etc.), or the "ribs" 120 of a plunge tunnel 104 being mined.

The system 100 further includes a side discharge conveyor 122 for discharging the mined material from the side of the flexible conveyor system 108 to the rigid transfer conveyor 116. The rigid transfer conveyor 116 is located in the roadway 106 and receives the mined material from the flexible conveyor system 108 thereby allowing the coal to flow continuously away from the plunge tunnel 104 being mined. The controller 110 further controls advancement of the rigid transfer conveyor 116 along the roadway 106 as the continuous miner 102 forms the plunge tunnels 104, which advantageously avoids the need to otherwise continually disassemble and re-assemble a fixed conveyor in the place of the rigid transfer conveyor 116. Each time the rigid transfer conveyor 116 is moved along the length of the developed roadway 106, it is located precisely relative the plunge tunnels 104 that have already been mined, and the plunge tunnels 104 that are designed to be mined as per the mine plan and associated predetermined path.

Figure 2:
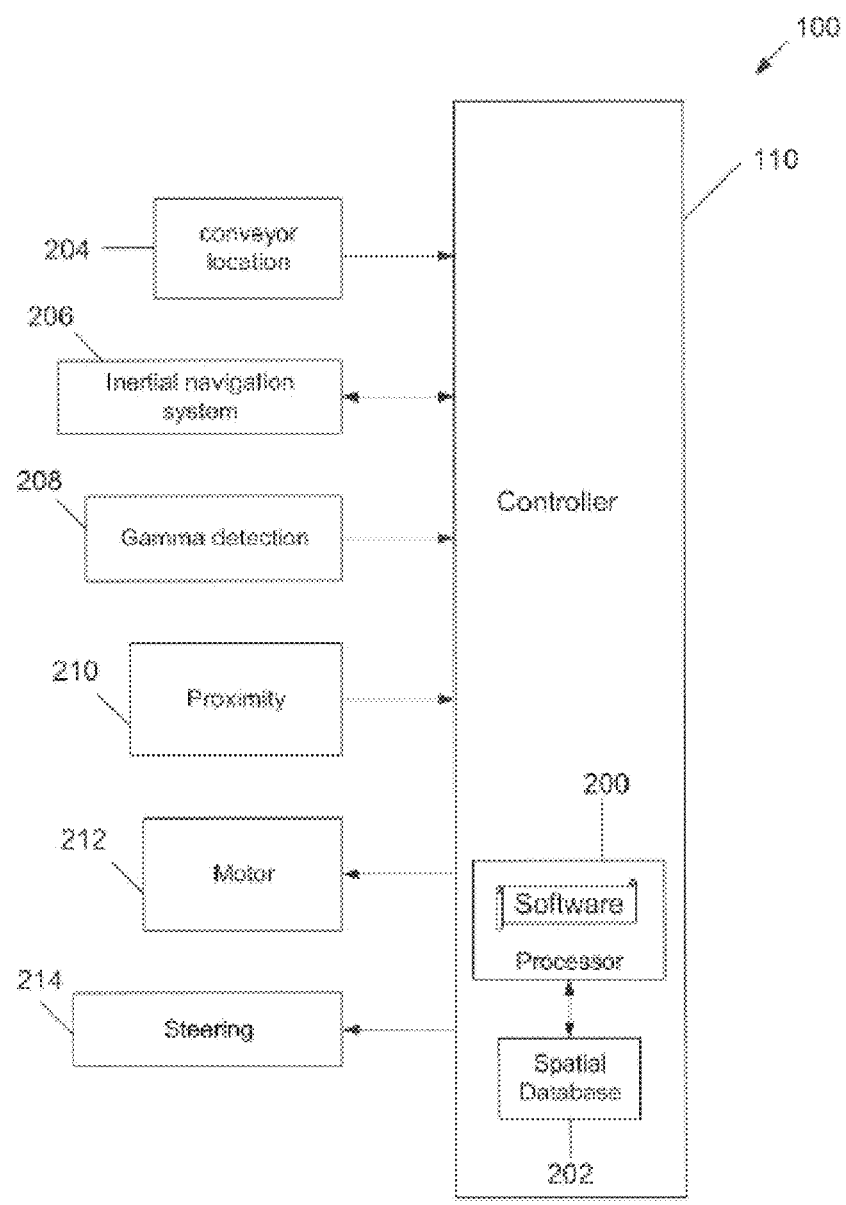
FIG. 2 is an electrical block diagram of the mining system of FIG. 1.

Turning to FIG. 2, the controller 110 includes a path planner 200, including a processor and software, for planning the predetermined path for the continuous miner 102 and flexible conveyor system 108. The path planner 200 plans waypoint paths for respective conveyor modules 114 of the flexible conveyor system 108 and stores them in planner database 202. The controller 110 controls the continuous miner 102 and flexible conveyor system 108 to go back and forth forming successive plunges tunnels 104, whilst making their way along the unmined block 112.

The system 100 further includes a rigid transfer conveyor location sensor 204 for sensing the location of the rigid transfer conveyor 116. The location sensor 204 may take several forms and can include physical or mechanical points or markers, or electronic device points or markers (such as RFD tag devices for example). The planner 200 also plans the formation of the next plunge tunnel 104 proximal to the sensed head location of the moving rigid transfer conveyor 116 which acts as a geometric reference point.

The unmanned continuous miner 102 includes an inertial navigation system 206 for navigating during formation of the plunge tunnels 104. The inertial navigation system 206 includes sensors for sensing characteristics including angle (e.g., horizon control) or positioning (e.g., heading). Once the start point of the inertial navigation system 206, the system 100 establishes precision guidance control and positional location of the system 206 relative to that starting point. The relative position of the continuous miner 102 is therefore always known by using this system 206, and this relative position is another important geometric reference insofar as establishing a further input for the derivation of the designated travel pathway that each plunge conveyor module 114 must travel along.

The distance that the plunge conveyor system 108 and continuous miner 102 have travelled along the developed roadway 106 adjacent to the plunge 104 and into the mined plunge 104 can also be measured by reference to several factors and by several means—which may include by reference to the known positional devices fitted to the rigid transfer conveyor 116, or by separate means from another known location device/tool that is configured and successively relocated along the length of the developed roadway 106 as the miner 102 advances from plunge 104 to plunge 104 (or periodically from groups of plunges etc.). The continuous miner 102 also includes a gamma detection device 208 for detecting the boundary of the coal seam during excavation.

Similarly, each serially interconnected conveyor module 114 includes a proximity sensor 210 for sensing the proximity of one or more walls of a plunge tunnel 104 in which it is located. Each module 114 may also be fitted with additional environmental sensors, one of which may be capable of measuring the distance of the plunge conveyor module 114 from the adjacent coal "rib" 120 to the side of each module 114. The location of the plunge conveyor module 114 relative to the adjacent coal "rib" 120 is another important geometric reference insofar as establishing a further input for the derivation of the designated travel pathway that each plunge conveyor module 114 must travel. Further, each conveyor module 114 includes a motor driver 212 for driving its wheels. The driver may be electrical, pneumatic or hydraulic. Each conveyor module 114 also includes steering 214 for steering its wheels. The steering may be electrical, pneumatic or hydraulic, and can include rams or rotary actuators.

Figure 3:
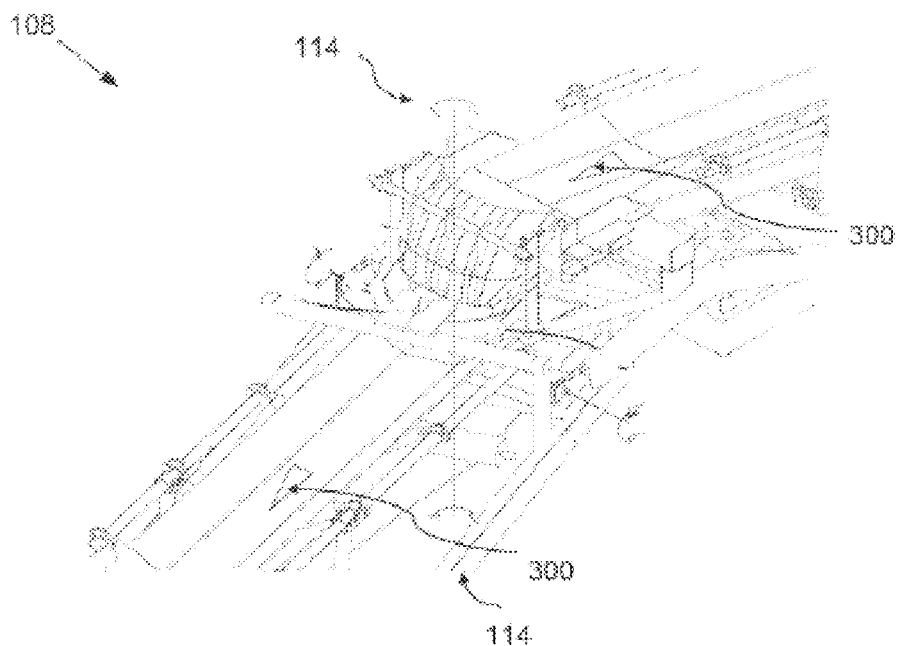
FIG. 3 is a perspective close-up view of a flexible conveyor system of the mining system of FIG. 1.

Turning to FIG. 3, each conveyor module 114 of the flexible conveyor system 108 is alike in construction. Each conveyor module 114 includes an inclined endless belt 300 for transporting the mined material so that material serially passes along the flexible conveyor system 108. The conveyor modules 114 are pivotally connected together.

Figure 4:
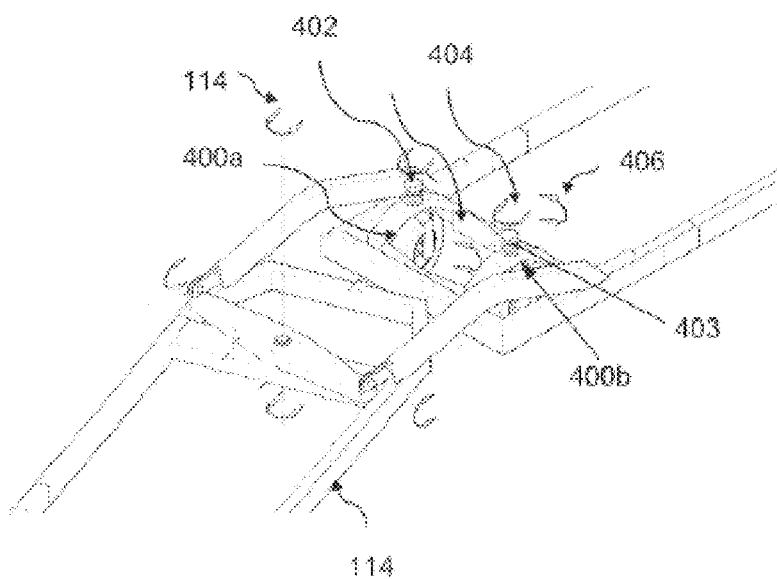
FIG. 4 is a perspective close-up view of the undercarriage frame of the flexible conveyor system of FIG. 3.

As can best be seen in FIG. 4, each conveyor module 114 includes two wheels 400a, 400b, although four can also be provided. One wheel 400a is driven to rotate about a vertical axis 402, whereas the other wheel 400b is driven to rotate about a vertical axis 404 and a longitudinal axis 406.

The flexible conveyor system may include serially interconnected flexible conveyor modules. Each conveyor module may include wheels. The wheels may include 2 or 4 wheels. Each conveyor may include a driver for driving the wheels. The driver may be electrical, pneumatic or hydraulic. Each conveyor may include steering for steering the wheels. The steering may be electrical, pneumatic or hydraulic. The steering may include rams or rotary actuators 403.

An automated mining method using the system 100 of FIG. 1 is briefly described.

Initially, the planner 200 plans the predetermined path for the continuous miner 102 coupled to the flexible conveyor system 108.

The controller 110 commands the continuous miner 102 to form plunge tunnels 104 from the roadway 106 in accordance with the predetermined path. Mined material is conveyed from the plunge tunnels 104, using the flexible conveyor system 108 coupled to the continuous miner 102, as the controller 110 controls the continuous miner 102 and the flexible conveyor system 108 to travel along the predetermined path.

The controller 110 further controls advancement of the rigid transfer conveyor 116 along the roadway 106 as the continuous miner 102 serially forms the plunge tunnels 104.

The controller 110 uses the system inputs 204, 206, 208, 210 to precisely control the system outputs 212, 214 and ensure that the flexible conveyor system 108 and the continuous miner 102 precisely follow the predetermined path without "fouling" or hitting either the coal "rib" 120 or the adjacent equipment 116, 118 in the developed roadway 106 adjacent the plunge 104 to be mined.

Feedback from each of the system devices/tools/sensors can be utilized as "inputs" into a specifically coded logic software and process control system, which can process such inputs to determine the location of the plunge conveyor modules 114 relative the designed travel pathway that they should be travelling along (to suit the intended plunge tunnel 104 to be mined), and hence corrective action/control inputs can be forwarded to the wheels 400 of the plunge conveyor system 108 which can then be power rotated and driven to control the particular plunge conveyor module 114 accordingly.

The entire system of feedback sensors and control devices, once established, operate automatically without human operator interface or control inputs—to control the steering of the plunge conveyor modules 114, thereby enabling the efficient operation of the mining process.

Each conveyor module 114 is independently driven and, by rotating the wheels 400 at designated locations, is capable of travelling back and forth along the designated travel pathway with adequate clearance maintained at all times from interferences and impacts.

A person skilled in the art will appreciate that many embodiments and variations can be made without departing from the ambit of the present invention.

In one embodiment, each conveyor module 114 can include endless tracks for improved traction and lower ground pressure than wheels 400.

In compliance with the statute, the invention has been described in language more or less specific to structural or methodical features. It is to be understood that the invention is not limited to specific features shown or described since the means herein described comprises preferred forms of putting the invention into effect.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more combinations. It is therefore contemplated that the appended claims will embrace any such alternatives, modifications and variations as falling within the true scope and spirit of the present invention.

Thus, having described the invention, what is claimed is:

1. A mining system including:
   a continuous miner;
   a first conveyor system coupled to the continuous miner for conveying mined material from the continuous miner to a second conveyor; and
   a controller coupled to the continuous miner and the first conveyor system, wherein the controller is configured to:
   determine a location of the second conveyor using a location sensor;
   determine formation of a plunge tunnel proximal to the determined location;
   control the continuous miner to form a plunge tunnel based on the determined formation; and
   control the first conveyor system to travel in the plunge tunnel formed by the continuous miner.

2. The mining system as claimed in claim 1, wherein the controller is further configured to controls the drive and steering of the continuous miner and the first conveyor system along a path stored in a database to avoid striking either any adjacent equipment, or the ribs of the plunge tunnel being mined.

3. The mining system as claimed in claim 1, wherein the controller is further configured to control advancement of the second conveyor along the roadway as the continuous miner forms a further plunge tunnels thereby avoiding the need to otherwise disassemble and re-assemble the second conveyor.

4. The mining system as claimed in claim 1, wherein the first conveyor system includes serially interconnected conveyor modules.

5. The mining system as claimed in claim 4, wherein the controller is configured to determine a waypoint path for each of the plurality of conveyor modules and store the determined waypoint paths in a database.

6. The mining system as claimed in claim 4, wherein each conveyor module includes 2 or 4 wheels.

7. The mining system as claimed in claim 6, wherein each conveyor module includes a driver for driving the wheels, the driver being electrical, pneumatic or hydraulic.

8. The mining system as claimed in claim 6, wherein each conveyor module includes steering for steering the wheels, the steering being electrical, pneumatic or hydraulic.

9. The mining system as claimed in claim 8, wherein the steering includes one or more rams or rotary actuators.

10. The mining system as claimed in claim 4, wherein each conveyor module includes a proximity sensor for sensing the proximity of one or more walls of the plunge tunnel in which the conveyor module is located.

11. The mining system according to claim 10, wherein the controller is further configured to:
   determine a path for the continuous miner and the first conveyor system;
   store the determined path in a database;
   receive data from the proximity sensor of each conveyor module from the plurality of conveyor modules, the received data indicating proximity of the conveyor module to one or more walls of the plunge tunnel formed by the continuous miner; and
   control at least one of drive and steering of each conveyor module based on the path stored in the databased and the received data, wherein the at least one of the drive and steering of the conveyor module is controlled independently of controlling other conveyor modules from the plurality of conveyor modules.

12. The mining system according to claim 11, wherein controlling the at least one of drive and steering of each conveyor module includes forwarding a corrective control to the first wheel and the second wheel of each conveyor module independently of controlling other conveyor modules based on the received data.

13. The mining system as claimed in claim 4, wherein each conveyor module includes a first wheel and a second wheel, wherein the first wheel is configured to be driven to rotate about a vertical axis and the second wheel is configured to be driven to rotate about a vertical axis and a horizontal axis.

14. The mining system as claimed in claim 1, wherein the controller is configured to determine a location of a head of the second conveyor using a location sensor including a marker.

15. The mining system as claimed in claim 14, wherein the controller is configured to determine formation of a further plunge tunnel proximal to the determined location of the head of the second conveyor.

16. The mining system as claimed in claim 1, wherein the continuous miner includes an inertial navigation unit.

17. The mining system as claimed in claim 1, further including a side discharge conveyor for discharging the mined material from the side of the first conveyor system to the second conveyor.

18. The mining system as claimed in claim 1, wherein the continuous miner is unmanned.

19. The mining system as claimed in claim 1, wherein the controller is wirelessly coupled with the continuous miner and the first conveyor system.

20. A computer-implemented method for controlling a continuous miner and a first conveyor system coupled with the continuous miner for conveying mined material from the continuous miner to a second conveyor, the method involving:
   determining a location of the second conveyor using a location sensor, the second conveyor is configured to receive the mined material from the first conveyor system;
   determining formation of a plunge tunnel proximal to the determined location;
   controlling the continuous miner to form a plunge tunnel based on the determined formation; and
   controlling the first conveyor system to travel in the plunge tunnel formed by the continuous miner.

* * * * *

UNITED STATES PATENT AND TRADEMARK OFFICE
CERTIFICATE OF CORRECTION

PATENT NO. : 12,146,409 B2  
APPLICATION NO. : 18/311008  
DATED : November 19, 2024  
INVENTOR(S) : Michael Mapp et al.

Page 1 of 1

It is certified that error appears in the above-identified patent and that said Letters Patent is hereby corrected as shown below:

In the Claims

Column 6, Claim 2, Line 38, change "controls" to "control"

Column 6, Claim 2, Line 38, remove "the"

Column 6, Claim 3, Line 46, change "tunnels" to "tunnel"

Signed and Sealed this  
Eighteenth Day of March, 2025

Coke Morgan Stewart  
*Acting Director of the United States Patent and Trademark Office*